Aug. 28, 1951  W. F. FUHRMAN  2,566,127
MIXER FOR BEVERAGE VENDING MACHINES AND THE LIKE
Filed Sept. 5, 1947
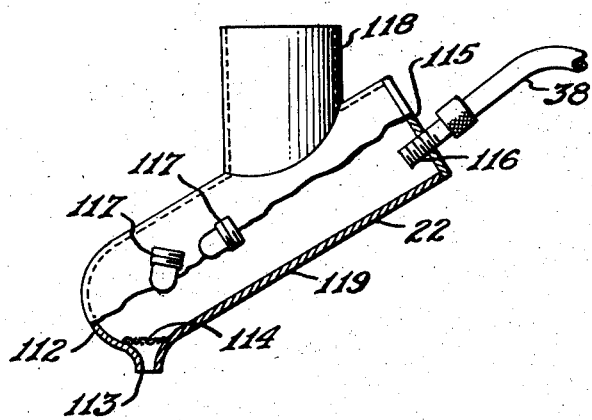
Inventor
WILLIAM F. FUHRMAN,
By
Attorneys.

UNITED STATES PATENT OFFICE 2,566,127

MIXER FOR BEVERAGE VENDING MACHINES AND THE LIKE

William F. Fuhrman, Newport, Ky., assignor of one-half to Elmer O. Gerth, Richmond, Ind.

Application September 5, 1947, Serial No. 772,361

3 Claims. (Cl. 259—4)

This invention relates to a mixer for automatic vending machines for beverages and the like. While it is capable of serving as a mixer for a variety of beverages, hot or cold, in which a number of ingredients are mixed together, I have shown and described it specifically for use with a machine for vending hot coffee. In connection with the description, I have used the words "coffee," "water," "cream" and "sugar," but it is to be understood that when I speak of "coffee," I intend to include any ingredient in finely divided solid form, and that when I speak of "cream" and "syrup," I mean any ingredients in liquid form and, of course, in connection with the word "water," I mean any other potable liquid.

A beverage vending machine with which the mixer of the present invention may be used is disclosed and claimed in my copending application Serial No. 179,821, filed August 16, 1950, which is a division of the present application. Other features of such a vending machine are disclosed and claimed in my copending applications, Serial No. 179,822, filed August 16, 1950, and Serial No. 179,823, filed August 16, 1950, which also are divisions of the present application.

It is an object of my invention to provide a mixing chamber into which coffee and water may be metered for mixing the same prior to their discharge into a cup.

Still another object of my invention involves the provision of a mixing chamber into which the various ingredients may be metered and which is so formed as to bring about a thorough mixing of the ingredients prior to their draining out of said chamber by gravity into a cup.

These and other objects of my invention, which will be pointed out in more detail hereinafter or which will be apparent to one skilled in the art upon reading these specifications, I accomplish by that certain construction and arrangement of parts, of which I shall now describe an exemplary embodiment. Reference is made to the drawings forming a part hereof and in which the single figure is an elevational view with parts in section of a mixing chamber according to my invention.

In the figure I have shown partly in elevation and partly in cross-section a mixing chamber 22. As is clearly apparent, this chamber is substantially cylindrical in form having its lower end smoothly rounded as at 112 and having at its lowest point a delivery fitting 113 preferably protected by a fine mesh screen 114. The upper end of the chamber 22 is closed by a head 115 through which a nozzle 116 connected to the tube 38 may deliver hot water to the chamber. It will be understood that the tube 38 is connected to a source of water or other potable liquid under pressure, provided with means for metering a predetermined amount thereof for each mixing operation. Fittings 117 are connected to tubes leading to the syrup and cream or other liquid ingredient supply respectively, and again it will be understood that means will be provided to supply such liquid ingredients in metered quantities for each mixing operation.

Opening into the chamber 22 from above is a hopper 118 for the coffee or other finely divided solid ingredient. This hopper is disposed immediately below the supply of such ingredient, which also will be provided with metering means. The hopper 118 is positioned fairly well up the length of the chamber, and it will be noted that the chamber is disposed with its axis at an angle to the horizontal. Thus coffee metered into the mixing chamber will impinge upon the lower wall of the chamber 22 in the region indicated at 119. The stream of water entering under pressure through the nozzle 116 will flush over the lower surface of the chamber 22, and by virtue of the smoothly rounded lower end of the chamber, considerable turbulence will result, thus insuring a thorough mixing of the ingredients. The turbulence is such that substantially no delivery will take place during the flow of water from the nozzle 116 which actually occupies a very short time. In the meantime, if desired, cream, syrup or both may be added through the fittings 117 into the turbulent liquid in the chamber 22. As soon as the flow of water through the nozzle 116 ceases, the liquid in the chamber simply drains out through the fitting 113 into a cup, which will be in position under the fitting 113.

From the foregoing description, it will be seen that I have provided a mixing chamber which is adapted to mix coffee with water either black, or with cream only, or with sugar only, or with cream and sugar. As pointed out above, the device with minor modifications, is adapted for use for mixing and delivery of other beverages than coffee in cups, and as a matter of fact it can deliver, with minor modifications which will be within the range of one skilled in the art, any mixed beverage including solid or liquid ingredients. For these reasons I do not intend to limit myself except as pointed out in the claims which follow.

Having now fully described my invention, what

I claim as new and desire to secure by Letters Patent is:

1. In a device of the character described, a mixing chamber comprising a substantially cylindrical shell disposed with its axis at an angle to the horizontal and having its lower end smoothly rounded, a delivery orifice disposed at the lowest point of said shell, a hopper for a solid ingredient opening into said shell from above, and positioned so that said ingredient falls on the sloping bottom surface of said shell, a nozzle for a liquid ingredient under pressure entering said shell at its upper end, so as to produce a swirling action at the rounded bottom of said shell to mix thoroughly said ingredients before they pass through said delivery orifice under the action of gravity.

2. In a device of the character described, a mixing chamber comprising a substantially cylindrical shell disposed with its axis at an angle of about 30° to the horizontal, said shell having a smoothly rounded lower end and a delivery port at its lowermost point, apertures for the addition of ingredients into said chamber, and a nozzle entering said chamber at its upper end and directed so that a stream of liquid passing into said chamber through said nozzle will impinge on the sloping bottom surface of said chamber and swirl around said smoothly rounded lower end before draining out through said delivery port.

3. A device according to claim 2, in which an aperture for addition of an ingredient in finely divided solid form is disposed on the upper side of said chamber in a position where such ingredient entering through said aperture falls on the inclined bottom surface of said chamber substantially in the region where said stream of liquid impinges thereon.

WILLIAM F. FUHRMAN.

REFERENCES CITED

The following references are of record in the file of this patent:

UNITED STATES PATENTS

| Number | Name | Date |
|---|---|---|
| 1,315,014 | Doerfer | Sept. 2, 1919 |
| 1,373,914 | Samuelson | Apr. 5, 1921 |
| 1,520,560 | Bruno | Dec. 23, 1924 |
| 1,534,982 | McLellan | Apr. 21, 1925 |
| 1,850,375 | Braun | Mar. 22, 1932 |
| 1,859,833 | Manley | May 24, 1932 |
| 1,864,947 | Selfridge | June 28, 1932 |
| 2,352,858 | Nicholson | July 4, 1944 |
| 2,374,168 | Bowman | Apr. 24, 1945 |
| 2,376,403 | Thompson et al. | May 22, 1945 |
| 2,433,054 | Line | Dec. 23, 1947 |

FOREIGN PATENTS

| Number | Country | Date |
|---|---|---|
| 12,197 | Great Britain | Aug. 5, 1890 |